Jan. 19, 1971   K. L. HERTEL   3,556,665
APPARATUS FOR DETERMINING THE SPAN LENGTH OF A LATERALLY
DISPERSED ARRAY OF FIBERS
Filed Jan. 19, 1968   3 Sheets-Sheet 1

*INVENTOR.*
KENNETH L. HERTEL

BY his ATTORNEYS

INVENTOR.
KENNETH L. HERTEL

INVENTOR.
KENNETH L. HERTEL
BY
Brumbaugh, Free, Graves & Donohue
his ATTORNEYS

United States Patent Office 3,556,665
Patented Jan. 19, 1971

3,556,665
APPARATUS FOR DETERMINING THE SPAN LENGTH OF A LATERALLY DISPERSED ARRAY OF FIBERS
Kenneth L. Hertel, Knoxville, Tenn., assignor to University of Tennessee Research Corporation, Knoxville, Tenn., a corporation of Tennessee
Filed Jan. 19, 1968, Ser. No. 699,099
Int. Cl. G01n 21/16, 21/32
U.S. Cl. 356—238    13 Claims

ABSTRACT OF THE DISCLOSURE

As described herein, a geometric fibrograph is provided which determines the distances spanned by 50 percent and 2.5 percent of a sample of fibers to be used in making yarn. This is accomplished by illuminating the base of a laterally dispersed array of fibers at an angle which is normal to the longitudinal axis of the fibers and measuring the amount of light transmitted through the base of the fibers to provide an indication of the 100 percent span distance. Thereafter, the fiber array is scanned in a transverse direction by light rays which illuminate the fiber array at angles in a horizontal plane of 30 degrees and approximately 1.5 degrees, respectively, and measurements taken of the amount of light transmitted through the sample. The fiber sample is scanned in the direction parallel to the fibers until the intensity of the light intercepted by the sample at the angles of 30 degrees and 1.5 degrees, respectively, equals the intensity of light intercepted by the fiber sample at the base thereof. At this point, the displacement in the direction parallel to the fibers between the base of the sample and those portions of the sample providing the same apparent fiber density at 30 degrees and 1.5 degrees is measured to provide an accurate indication of the 50 percent and 2.5 percent span lengths.

BACKGROUND OF THE INVENTION

This invention relates to measuring devices for determining the span length of fibers and, more particularly, to a geometric fibrograph for determining fiber span lengths in a more rapid and convenient manner than has been possible heretofore.

The strength of a yarn made of continuous filaments or fibers is substantially equal to the sum of the strengths of the individual fibers. When this type yarn ruptures, all the fibers rupture. However, in a yarn made from fibers of short lengths, not all the fibers in the cross-section of the yarn are ruptured upon rupture of the yarn. This is true because some of the fibers terminate in the region of the rupture and, hence, do not exert their full potential of tension. It follows, therefore, that in a high quality yarn a substantial number of the fibers extend across the area of rupture. A measure of the quality of the yarn is the 50 percent span length or the length of the region which, on the average, one-half of the fibers span.

In the attenuation process for the fibers, the drawing frame has several pairs of rollers, each advanced set of which revolves at a progressively faster speed. In order to maintain the best control over the fibers, the pair of rollers must be set so that the fibers spend the most amount of travel under one pair of rollers but little or no time under two pairs of rollers simultaneously. Empirically, it has been established that the distance spanned by only 2.5 percent of the fibers in a sample is a convenient criterion for spacing the rollers and making other distance settings in fiber processing machinery. This distance is termed the 2.5 percent span length.

In the past, digital fibrographs and like devices have been devised to determine appropriate span lengths. A shortcoming with many of these devices is that they require a direct relationship between the number of fibers in a sample and the amount of light intercepted by the sample. Another shortcoming is that these devices require a plurality of individual light sources to illuminate different portions of the sample in order to determine different span lengths.

SUMMARY OF THE INVENTION

Accordingly, it is an object of the present invention to provide a geometric fibrograph which overcomes the above-mentioned disadvantages of the prior art.

It is another object of the present invention to provide a geometric fibrograph which determines various span lengths and establishes the proportion of filaments by geometric means.

It is still another object of the present invention to provide a geometric fibrograph wherein the effect of the variation in density across the width of the sample of fiber is minimized.

These and other objects of the present invention are accomplished by illuminating the base of a laterally dispersed array of fibers held at one end and detecting the intensity of light transmitted through this portion of the sample at a first angle to the array. The array is also scanned in a transverse direction by light rays which pass through the yarn at a second angle of incidence which is related to the first angle in accordance with the span length of the fibers which is to be ascertained. The intensity of light transmitted through the sample at the two selected angles is detected. Scanning of the sample continues until the intensity of the light intercepted by the sample at the first angle reaches a desired relation to the intensity of the light angularly intercepted at the second angle. At this point, the displacement between the base of the sample and the portion of the sample providing the related light interception corresponds to the selected span length of the fibers.

In a preferred embodiment of the invention, the geometric fibrograph comprises a holder for gripping at random the sample of fibers to be tested and holding the fibers in parallel relation in a laterally dispersed array, called a "beard." A vertically adjustable light source is mounted in the fibrograph at a predetermined small angle, to the extent of the array, in order to provide the requisite illumination in the fibrograph. To provide an indication of two different span lengths a first photocell is mounted at an opposite end of the array from the light source and is movable with the light source in the direction parallel to the fibers. A second vertically adjustable photocell is also mounted on one side of the array, a mirror being provided on the other side to reflect light from the source through the array at a larger angle. In order to provide a reference representing 100% span length, a rotatable mirror and a fixed photocell are mounted on opposite sides of the array so that light from the source is reflected perpendicularly through the base of the array.

DESCRIPTION OF THE PREFERRED EMBODIMENT

Figure 1:
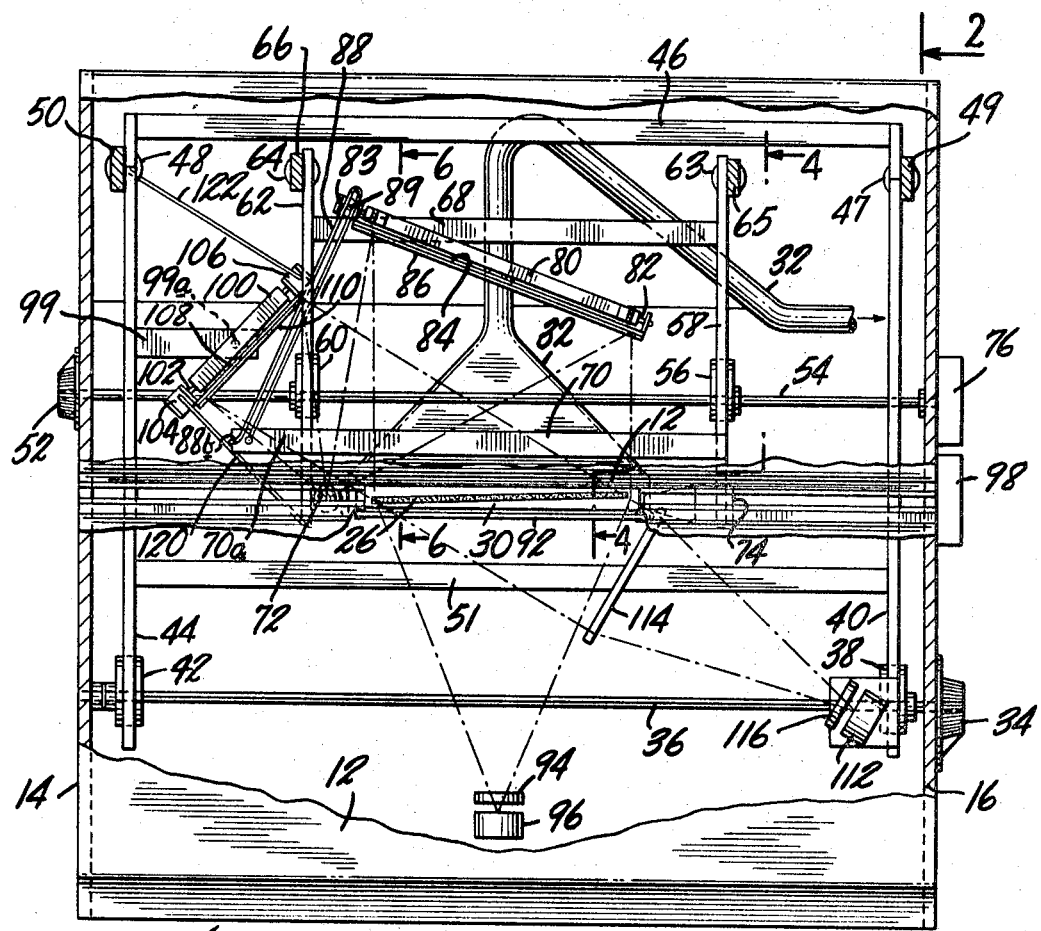
FIG. 1 is a top plan view, partly broken away, of an illustrative geometric fibrograph arranged according to the present invention.
Figure 4:
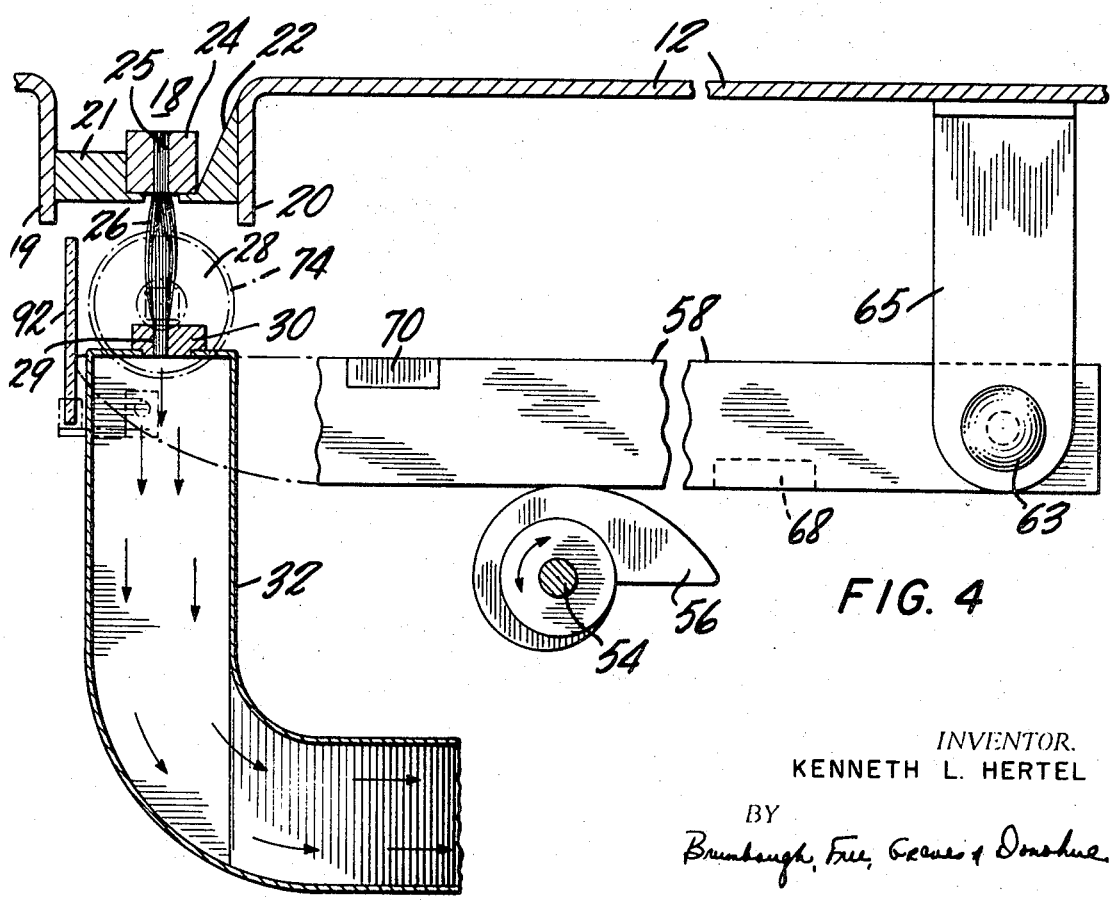
FIG. 4 is a sectional view of the geometric fibrograph taken along line 4—4 of FIG. 3 and looking in the direction of the arrows.
Figure 6:
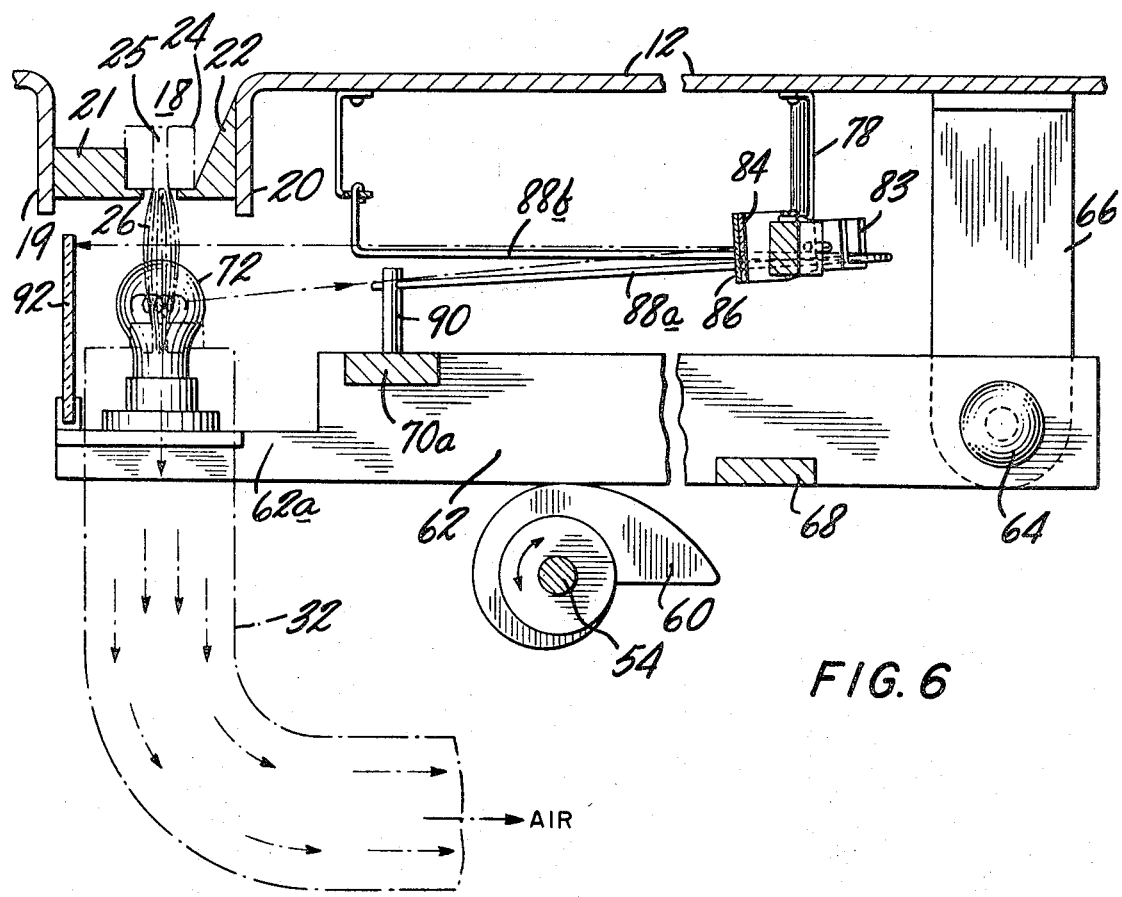
FIG. 6 is a view in section of the geometric fibrograph taken along line 6—6 of FIG. 5 and looking in the direction of the arrows.

According to the invention, the illustrative embodiment of a geometric fibrograph shown in FIG. 1 includes a housing 10 which is provided with a top wall 12 and a pair of side walls 14 and 16. Referring to FIGS. 4 and 6, defining an opening 18 in the top wall 12 are a pair of side walls 19 and 20. Affixed to the side walls 19 and 20 are a generally rectangularly shaped support bar 21 and a generally triangularly shaped support bar 22, respectively. A holder 24 having a generally square-shaped cross section is removably mounted on the bars 21 and 22 and extends along the length of the opening 18. Formed in the holder 24 is an opening 25 through which a laterally dispersed array or beard of fibers 26 to be tested is passed. The walls 19 and 20, the support bars 21 and 22, the holder 24 and the opening 25 extend in a direction which is perpendicular to the side walls 14 and 16.

The beard 26 which may be, for example, a conventional random fiber specimen having a width of six inches, is gripped substantially at the base thereof by the holder 24 and extends from the aperture 25 through an area of illumination 28 and then into an off-center opening 29 formed in a holder 30 extending beneath and in parallel with the holder 24. Mounted beneath the holder 30 and communicating with the beard 26 through the opening 29 is an air duct 32 which makes certain that the beard 26 has the appropriate projected width across the area of illumination by pulling the fibers toward the holder 30. An exhaust fan or the like (not shown) mounted outside the fibrograph may be employed to exhaust air through the duct 32. While the holder 30 extends in parallel with the holder 24, the opening 29 extends at a predetermined angle, preferably 88.5 degrees, with respect to the side walls 14 and 16 of the housing 10.

It will be noted that the holder grips the base of the beard 26 almost immediately above the outlet opening of the holder 24 so that in the illumination area beneath the holder, the beard 26 has a fiber density of substantially 100 percent. The fiber density of the beard decreases toward the bottom of the beard 26 in the illumination area 28. For example, if the beard has a density of 20,000 fibers per lateral inch at the base, at the 50 percent span length the beard has a density of 10,000 fibers per inch and at the 2.5 percent span length the beard has a density of 500 fibers per inch.

As will be explained in detail hereinbelow, if a beard having a 6 inch width and a density of 20,000 fibers per inch at the base is viewed at the 50 percent span length and at an incidence angle of 30 degrees in a horizontal plane, the beard presents an apparent width of 3 inches. Accordingly, the beard will have an optical density of 10,000 fibers per one-half inch or 20,000 fibers per inch, the same as the fiber density at the base of the beard. Similarly, at the 2.5 percent span distance wherein the beard has a density of 500 fibers per inch, the beard will have an apparent density of 20,000 fibers per inch when the beard is viewed at an incidence angle of 1.5 degrees to give a projected width of 0.150 inch.

Figure 2:
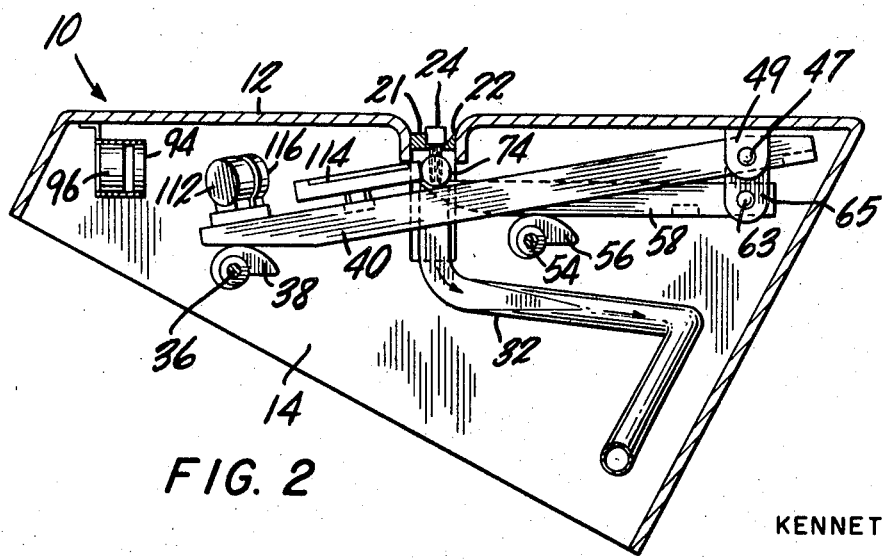
FIG. 2 is a view in section of the geometric fibrograph taken along line 2—2 of FIG. 1 and looking in the direction of the arrows.
Figure 3:
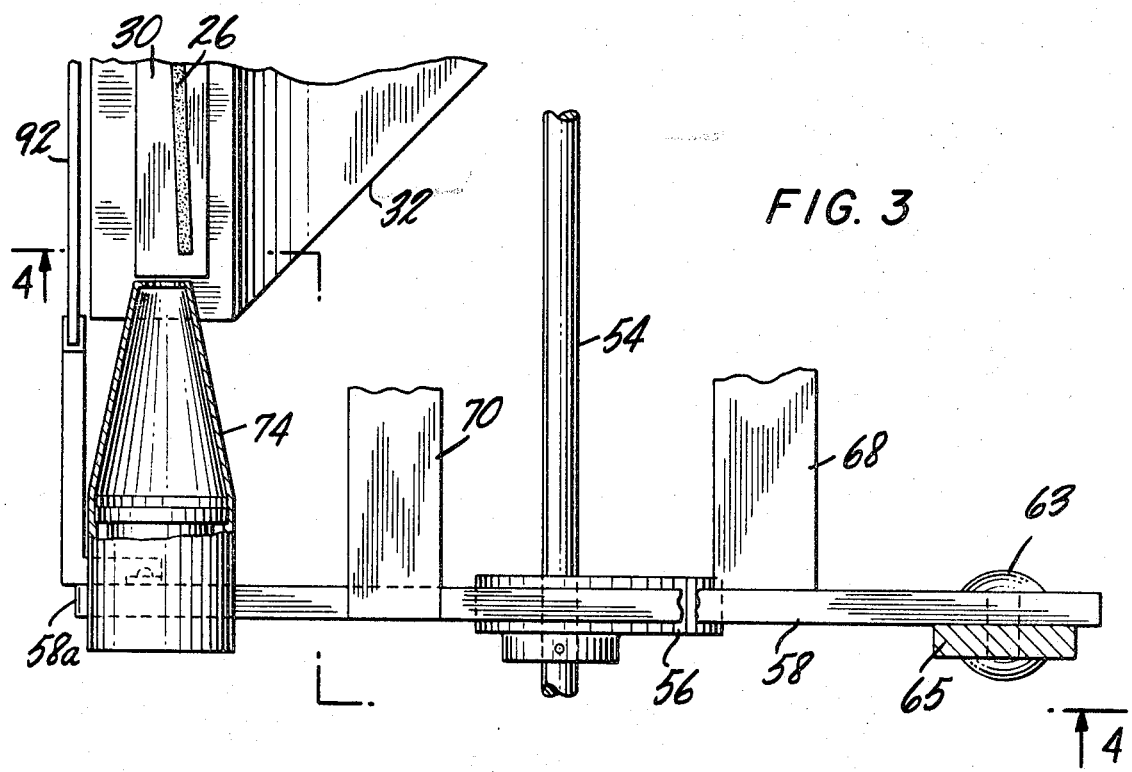
FIG. 3 is an enlarged fragmentary plan view of the broken away portion of the geometric fibrograph illustrated in FIG. 1.

Referring to FIGS. 1 and 2, mounted on the side wall 16 of the housing 10 is a knurled hand wheel 34 which includes a dial and graduated scale affixed thereto. A shaft 36 is secured to the wheel 34 and extends through a corresponding opening formed in the side wall 16 and across the housing 10 to the side wall 14 of the housing. Mounted on the shaft 36 adjacent the side wall 16 is a cam 38 which engages one end of a pivotal lever arm 40. Adjacent the side wall 14, another cam 42 is similarly mounted on the shaft 36, the cam 42 supporting one end of a pivotal lever arm 44. The lever arms 40 and 44 are coupled together at their other ends by a connecting member 46 and pivot on pins 47 and 48, respectively, extending downwardly from the top wall 12. Further coupling the lever arms 40 and 44 together is a second connecting member 51 which is positioned relatively close to the pin 36. The dial and graduated scale affixed to the hand wheel 34 provide a direct indication of the vertical displacement of the lever arms 40 and 44 in response to the rotation of the hand wheel 34.

A second knurled hand wheel 52 is mounted on the side wall 14 and similarly includes a dial and graduated scale. Secured to the wheel 52 is a shaft 54 which extends through a corresponding opening formed in the side wall 14 and thence across the housing 10 to the side wall 16. Within the area defined by the shaft 36, the lever arms 40 and 44 and the connecting member 46, a first cam 56 is mounted on the shaft 54 for engaging a lever arm 58. Similarly mounted on the shaft 54 and laterally displaced from the cam 56 is a second cam 60 which supports a lever arm 62. The lever arms 58 and 62 are pivotable about pins 63 and 64, respectively, which are mounted in a pair of support bars 65 and 66, respectively, affixed to the top wall 12. A pair of support bars 68 and 70 extending on opposite sides of the pin 54 function to further couple the lever arms together. The support bar 68 terminates at its opposite ends in the lever arms 58 and 62 while the support bar 70 includes an end portion 70a which extends beyond the lever arm 62. Again, the dial and graduated scale affixed to the hand wheel 52 provide a direct indication of the vertical displacement of the lever arms 58 and 62 in response to the rotation of the hand wheel 52.

As best shown in FIGS. 4 and 6, the lever arms 58 and 62 include stepped cutouts 58a and 62a formed at their ends outside the support bar 70. A light source 72, supplied with current from a suitable source, is mounted in the cutout 62a and a corresponding aligned photocell 74 with an entrance or defining slit (not shown) is mounted in the cutout portion 58a on the opposite end of the beard 26. As above mentioned, the aperture 29 of the holder 30 (FIG. 4) extends in a direction which is at an approximate angle of 88.5 degrees with respect to the side walls 14 and 16 and, hence, the angular deviation between the transverse axis of the beard 26 and the light source 72 and the photocell 74 is 1.5 degrees. For the beard specimen having a width of 6 inches, the apparent width of the beard 26 as illuminated by the light source is 6·sin 1.5 degrees or 0.150 inch. The photocell 74 develops a voltage signal proportional to the amount of light transmitted through the beard 26. As will be explained more fully hereinafter, the light source 72 and the photocell 74 with its defining slit are moved vertically along the longitudinal axis of the beard 26 until the voltage signal generated by the photocell 74 equals the voltage signal corresponding to an apparent 100 percent fiber density. The signal is supplied to one input terminal of a meter 76 mounted on the side wall 16 of the housing 10 which, as will be explained hereinafter, provides a direct indication of the difference in the amount of light transmitted through the beard 26 at the 100 percent and 2.5 percent span lengths.

Figure 5:
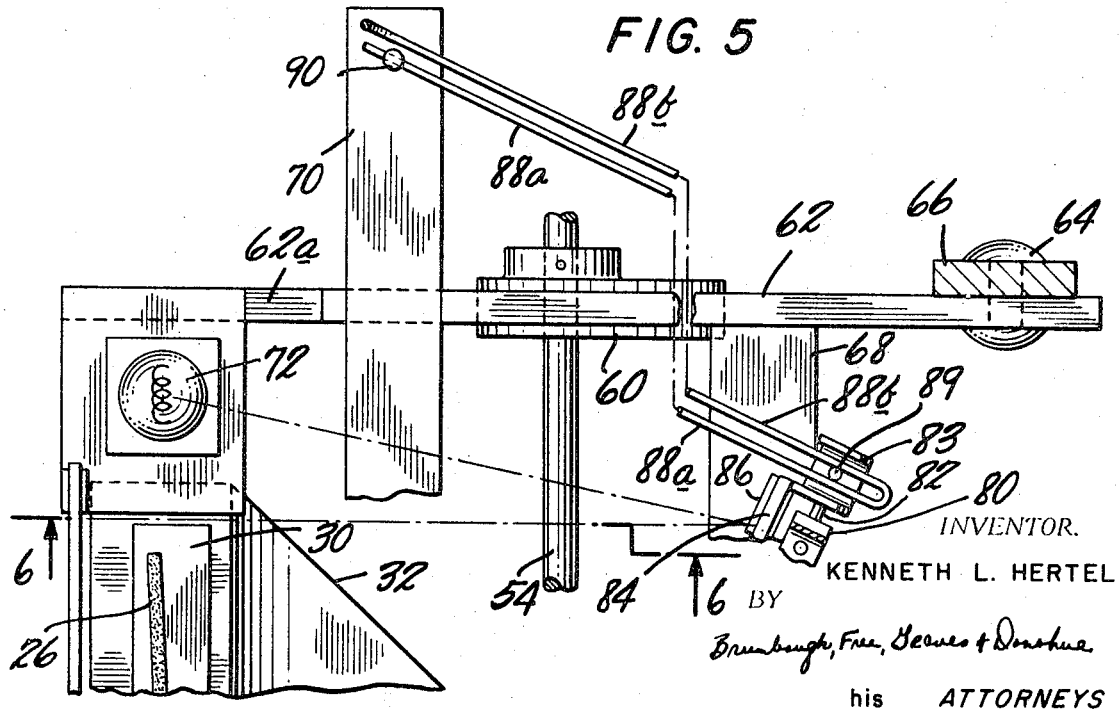
FIG. 5 is another enlarged fragmentary plan view of the broken away portion of the geometric fibrograph illustrated in FIG. 1.

As shown in FIGS. 1, 5 and 6, affixed to a pair of rods 78 extending downwardly from the top wall 12 is a support member 80. A rotatable pin 82 extends through a corresponding opening formed in the support member 80. One end of the pin terminates in a rotatable block 83. Mounted on the pin 82 and rotatable therewith is a mirror 84 and attached to the mirror 84 is a Fresnel lens 86 which transforms the non-parallel narrow light beam reflected from the surface of the mirror 84 into a parallel light beam. The mirror 84 and lens 86 are positioned within the housing 10 such that the light rays received from the source 72 are reflected through the entire width of the beard 26 immediately beneath the base thereof at an angle which is normal to the longitudinal axis of the beard 26.

Rotation of the block 83 and, accordingly, the mirror 84 and the lens 86 is controlled by a loop spring 88. The spring 88 is secured at its looped end to a pin 89 affixed to the block 83. One arm 88a of the spring is fixed to a post 90 attached to the extended portion 70a of the movable lever arm 70. The other arm 88b of the spring is secured to the top wall 12 of the housing 10. By employing the loop spring 88, it can be seen that the mirror 84 and Fresnel lens 86 will rotate a distance equal to one-half the vertical displacement of the lever arm 70. Because of the rotation of the mirror 84 and the Fresnel lens 86, the illumination of the base of the beard 26 remains fixed, notwithstanding the vertical movement of the light source 72. Specifically, as the light source 72 moves upwardly, the mirror 84 and the lens 86 rotate in a vertical plane in a direction toward the connecting member 46. As the light source 72 moves downwardly, the mirror 84 and the lens 86 rotate in a vertical plane in a direction toward the shaft 54.

Associated with the mirror 84 and the Fresnel lens 86 is a second Fresnel lens 92. The lens 92 is mounted in the housing 10 adjacent the holder 30 and focuses the light transmitted through the area immediately beneath the base of the beard 26 through a light variable filter 94 onto a fixed photocell 96. The photocell 96 develops a voltage signal which is proportional to the amount of parallel light passed through the beard 26. This voltage signal, which corresponds to substantially a 100 percent fiber density reading, is then supplied to the other input terminal of the meter 76 and to one input terminal of a meter 98 through conductors (not shown). The meter 76 indicates the difference in the magnitudes of the voltage signals generated by the photocells 74 and 96 and, as will be explained hereinbelow, the meter 98 indicates the difference in the magnitudes of the voltage signals generated by the photocell 96 and a photocell associated with the 50 percent span length.

Referring to FIG. 1, attached to a rod 99a extending upwardly from a generally rectangular support bar 99 secured to the lever 44 is a support member 100. The support member 100 has a central opening formed therein for receiving a rotatable pin 102. The ends of the pin 102 are secured within corresponding openings formed in a pair of rotatable blocks 104 and 106, respectively. Affixed to the pin 102 and rotatable therewith is a very narrow mirror 108 having its reflecting surface covered by a Fresnel lens 110. The Fresnel lens 110 transforms the narrow non-parallel beam of light reflected from the surface of the mirror 108 into a parallel light beam. The support member 100, the mirror 108 and the Fresnel lens 110 are positioned within the housing such that the light rays received from the source 72 are reflected as parallel light rays and intercept the beard 26 at an angle of 30° with respect to the width of the beard 26 in a horizontal plane.

The light transmitted through the beard 26 is brought to focus on a photocell 112 mounted on the lever arm 40 by a Fresnel lens 114 mounted on the second connecting member 51 (FIG. 2). Interposed between the Fresnel lens 114 and the photocell 112 and also mounted on the lever arm 40 is a light variable filter 116. The photocell 112 develops a voltage signal proportional to the amount of parallel light reflected from the mirror 108 and transmitted angularly through the beard 26. This signal is supplied through conductors (not shown) to the other input terminal of the meter 98 such that the meter 98 provides a visual indication of the difference in the magnitudes of the voltage signals developed by the photocells 96 and 112 and, hence, the difference in the amount of light transmitted through the 100 percent and 50 percent span lengths, respectively, of the beard 26.

Because the photocell 112 and the filter 116 are mounted on the lever arm 40, they move vertically with the arms 40 and 44 and therefore with the support member 100 when the arms are adjusted vertically by the rotation of the wheel 34. Similarly, the Fresnel lens 114 also moves vertically together with the lever arm 40. The wheel 34 is rotated to implement the angular scanning of the beard 26 along the longitudinal axis thereof, as will be more fully described hereinbelow. To maintain an alignment between the photocell 112, the Fresnel lens 114 and the mirror 108, the mirror 108 is caused to rotate in a vertical plane in a direction which is toward and away from the support member 100 and to rotate a circumferential distance equal to one-half the vertical displacement of the light source 72. Specifically, rotation of the mirror 108 and the Fresnel lens 110 is controlled by a spring member 120 which couples the rotatable block 104 to the movable lever arm 62 and a spring member 122 which couples the rotatable block 106 to the pivot pin 48 of the support arm 50. The springs 120 and 122 are equal in length so that rotation of the mirror 108 and the Fresnel lens 110 caused by the vertical displacement of one end of the spring 120 causes the mirror and lens to rotate one-half the vertical displacement of the light source 72. In this manner, the reflected light always falls onto the entrance slit of the photocell 112, notwithstanding the vertical displacement of the light source 72. Scanning for the 50 percent span length is accomplished by rotation of the hand wheel 34 which causes the vertical displacement of the support member in a direction parallel with the longitudinal axis of the fibers.

In operation, the base of the beard to be tested is gripped by the holder 24 and the holder is positioned onto the support members 21 and 22, the aperture 29 of the holder 30 extending obliquely of the walls 19 and 20 such that the light rays generated by the light source 72 intercept the beard 26 in a horizontal plane at an angle of 1.5 degrees. Similarly, the mirror 84, the Fresnel lens 86 and the mirror 108, Fresnel lens 110, respectively, are arranged in the housing 10 such that a parallel beam of light reflected from the mirror 84 intercepts the beard 26 in a horizontal plane at an angle of 90 degrees and the parallel beam of light reflected from the mirror 108 intercepts the beard 26 in a horizontal plane at an angle of 30 degrees.

Prior to the placement of the holder 24 into the housing 10, the light source 72 is energized and the light variable filters 94 and 116 associated with the photocells 96 and 112, respectively, are adjusted such that the voltage signals derived by the photocells 74, 96 and 112 are balanced. A null or "0" reading by the meters 76 and 98 provides a visual indication of the balance between the magnitudes of the voltage signals derived by the photocells 74, 96 and 112. Thereafter, the beard 26 is positioned in the housing with the base of the beard 26 being gripped by the holder 24.

With the parallel beam of light reflected from the mirror 84 and intercepting the beard 26 immediately beneath the base thereof, the photocell 96 develops a voltage signal corresponding substantially to the 100 percent span length or 100 percent fiber density. To measure the 50 percent span length, the hand wheel 34 is rotated which causes the vertical displacement of the support member 100 and the mirror 108 and Fresnel lens 110 to thereby implement the vertical spanning of the beard 26 by the parallel light beam reflected back from the mirror 108 and the Fresnel lens 110.

It can be seen that the positioning of the light source 72 does not require adjustment because the light beam transmitted through the beard 26 always falls on the photocell 112. This is true because any vertical displacement of the light source 72 causes the mirror and lens to rotate in a vertical plane a distance equal to one-half the displacement of the light source and thereby make certain that the reflected light is always aligned with the photocell 112. Accordingly, the hand wheel 34 is rotated to effect the vertical displacement of the photocell 112 and the vertical displacement of the support member 100 until the meter 93 indicates a zero voltage difference between the voltage signals developed by the photocells 96 and 112. The vertical displacement of the photocell 112 with respect to the photocell 96 is read directly from the graduated scale provided on the hand wheel 34. This displacement corresponds to the 50 percent span length of the beard 26.

To measure the 2.5 percent span length, the hand wheel 52 is rotated to implement the vertical displacement of the light source 72 and the photocell 74. This adjustment takes place until the meter 76 indicates a zero voltage difference between the voltage signals developed by the photocells 96 and 74. The vertical displacement between the photocell 74 and the photocell 96 is read directly from the graduated scale provided on the hand wheel 52. This displacement corresponds to the 2.5 percent span length of the beard 26. It will be noted that the light reflected back through the beard 26 from the mirror 84 always intercepts the beard 26 immediately beneath the base thereof and the light transmitted through the beard 26 always falls on the face of the fixed photocell 96. This is accomplished by effecting the rotation of the mirror 84 and the Fresnel lens 86 over a distance equal to one-half the vertical displacement of the light source 72, as above described.

Although the invention has been described herein with reference to a specific embodiment, many modifications and variations therein will readily occur to those skilled in the art. For example, to measure other appropriate span lengths, additional photocells and corresponding reflecting mirrors and lenses may be mounted according to the invention within the fibrograph. Additionally, the operator of the device may be replaced by an automated system that maintains a continuous balance between each pair of photocells and records only at the proper position of the photocells. Also, the fibrograph may be utilized on a moving specimen with the final readings being recorded at full light interception. Accordingly, all such variations and modifications are included within the intended scope of the invention as defined by the following claims.

What is claimed is:

1. A geometric fibrograph for determining a span length of a laterally dispersed array of fibers comprising optical means for directing light beams through a laterally dispersed fiber sample at first and second angles, respectively; adjusting means for controlling the displacement between the two beams in the direction of the fibers; detecting means for detecting the intensity of the two light beams after transmission through the sample and indicator means for indicating the displacement between the portions of fibers illuminated by the two beams which provide corresponding amounts of light interception.

2. A geometric fibrograph according to claim 1 wherein the optical means comprises a light source relatively movable with respect to the laterally dispersed array of fibers for illuminating portions of the fibers at the first angle of incidence to implement the scanning of the fibers in a lengthwise direction and reflector means disposed at the second angle with respect to the longitudinal axis of the fibers and responsive to the light rays generated by the light source for directing the light rays through a selected portion of the fibers at the second angle of incidence.

3. A geometric fibrograph according to claim 2 further comprising at least one other reflector means relatively movable with respect to the laterally dispersed array of fibers and disposed at another predetermined angle with respect to the longitudinal axis of the fibers and responsive to the light rays generated by the light source for directing the light rays through portions of the fibers at a third angle of incidence to implement the further scanning of the fibers in a lengthwise direction.

4. A geometric fibrograph according to claim 3 wherein the detecting means comprises further means for detecting the intensity of the light transmitted through the fibers from the at least one other reflector means and wherein the indicator means indicates the displacement between the portions of the fibers illuminated by the light source, the reflector means and the at least one other reflector means which provide the same amount of light interception.

5. A geometric fibrograph according to claim 4 wherein the adjusting means comprises first control means for controlling the movement of the light source with respect to the fibers and for controlling the positioning of the reflector means and the at least one other reflector means and second control means for controlling the movement of the at least one other reflector means with respect to the fibers.

6. A geometric fibrograph according to claim 4 wherein the detecting means comprises a first light responsive device aligned and movable with the light source and responsive to the light transmitted through the fibers for developing a voltage signal, a second light responsive device responsive to the light reflected from the reflector means through a selected portion of the fibers for developing a voltage signal, a third movable light responsive device responsive to the light reflected from the at least one other reflector means through portions of the fibers for developing a voltage signal and meter means responsive to the voltage signals developed by the first, second and third light responsive devices for providing a visual readout of the difference in the magnitudes of the individual voltage signals.

7. A geometric fibrograph for determining different span lengths of a laterally dispersed array of fibers comprising a housing, a holder for gripping the fibers at the base thereof, a movable light source mounted in the housing for illuminating portions of the fibers at an incidence angle of approximately 1.5 degrees, a corresponding aligned first photocell movable with the light source for developing a voltage signal corresponding to the amount of light angularly transmitted through the portions of the fibers from the light source, a first pivotal reflecting surface mounted in the housing and responsive to the light generated by the light source for reflecting the light through a selected portion of the fibers below the holder at an incidence angle of 90 degrees, a second photocell mounted in the housing for developing a voltage signal corresponding to the amount of light angularly transmitted through the selected portion of the fibers by the fisrt pivotal reflecting surface, a second pivotal reflecting surface mounted in the housing and movable with respect to the laterally dispersed array of fibers and responsive to the light generated by the light source for reflecting the light through portions of the fibers at an incidence angle of 30 degrees, a third photocell mounted in the housing movable concurrently with the movement of the second reflecting surface for developing a voltage signal corresponding to the amount of light angularly transmitted through the portions of the fibers by the second pivotal reflecting surface and indicator means for indicating the displacement between the first photocell and the second photocell and between the third photocell and the second photocell when the magnitudes of the voltage signals derived by the photocells are the same.

8. A geometric fibrograph according to claim 7 further comprising first control means for controlling the vertical movement of the light source and the aligned first photocell and for controlling the pivotal movement of the first pivotal reflecting surface and the second pivotal reflecting surface.

9. A geometric fibrograph according to claim 8 further comprising second control means for controlling the vertical movement of the second pivotal reflecting surface and for controlling the vertical movement of the third photocell.

10. A geometric fibrograph according to claim 9 wherein the first control means comprises means for pivoting the first reflecting surface and means for pivoting the second reflecting surface and a circumferential distance equal to one-half the vertical displacement of the light source and the aligned first photocell.

11. A geometric fibrograph according to claim 7 further comprising meter means coupled to the first, second and third photocells for providing a visual readout of the difference in the magnitudes of the individual signals developed by the photocells.

12. A geometric fibrograph according to claim 7 further comprising first lens means interposed between the first reflecting surface and the second photocell and responsive to the light rays reflected from the first reflecting surface for transforming the light rays into parallel light rays and for focusing the parallel light transmitted angularly through the fibers onto the second photocell.

13. A geometric fibrograph according to claim 12 further comprising second lens means interposed between the second reflecting surface and the third photocell and responsive to the light rays reflected from the second reflecting surface for transforming the light rays into parallel light rays and for focusing the parallel light rays transmitted angularly through the fibers onto the third photocell.

References Cited

UNITED STATES PATENTS

| | | | |
|---|---|---|---|
| 3,019,972 | 2/1962 | Strother | 250—219 Web |
| 3,174,046 | 3/1965 | Lindemann et al. | 250—219 Web |

FOREIGN PATENTS

| | | | |
|---|---|---|---|
| 691,069 | 5/1953 | Great Britain. | 356—238 |

OTHER REFERENCES

German printed applications: 1,130,202, May 1962, Germany, Schnab and Heiman; 1,255,325, November 1967, Richter.

JAMES W. LAWRENCE, Primary Examiner

C. M. LEEDOM, Assistant Examiner

U.S. Cl. X.R.

26—70; 73—159; 250—219; 356—242, 244